United States Patent

Barth et al.

[15] 3,635,493
[45] Jan. 18, 1972

[54] TRACTOR FRONT-END WEIGHT ASSEMBLY

[72] Inventors: Hubert Barth, Mannheim; Klaus Hauk, Altrip, Ludwigshafen, both of Germany

[73] Assignee: Deere & Company, Moline, Ill.

[22] Filed: Aug. 7, 1970

[21] Appl. No.: 61,991

[30] Foreign Application Priority Data

Aug. 14, 1969 Germany ..................P 19 41 316.2

[52] U.S. Cl. ...........................................280/150 E
[51] Int. Cl. ...........................................B60r 27/00
[58] Field of Search ..............................280/150 E; 187/9

[56] References Cited

UNITED STATES PATENTS

| | | | |
|---|---|---|---|
| 3,003,785 | 10/1961 | Straszheim | 280/150 E |
| 3,490,787 | 1/1970 | Latterman | 280/150 E |
| 3,492,019 | 1/1970 | Folkerts | 280/150 E |

*Primary Examiner*—Leo Friaglia
*Assistant Examiner*—Robert R. Song
*Attorney*—H. Vincent Harsha, Harold M. Knoth, William A. Murray, John M. Nolan, Raymond L. Hollister and Jimmie R. Oaks

[57] ABSTRACT

A barlike base weight is fixed crosswise to the forward end of a tractor and includes a transverse, upturned lip over which hook-shaped portions of two or more identical plate-shaped weights may be engaged. The mounted weights are disposed in side-to-side abutting relationship, and are centered transversely and kept from shifting sideways on the base weight by a centering pin. The weights are held tightly against each other and fixed in relation to the centering pin by a pair of clamping screws respectively inserted, from the opposite sides of the mounted weights, through upper and lower transversely aligned bores. The base weight includes a first hitch connection which may be used when none of the plate-shaped weights are mounted on the base weight, and a second hitch connection is provided by cooperating portions of the weights when they are mounted on the base weight.

16 Claims, 3 Drawing Figures

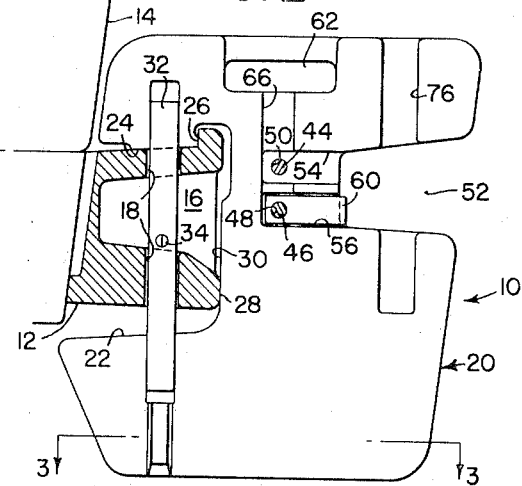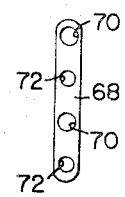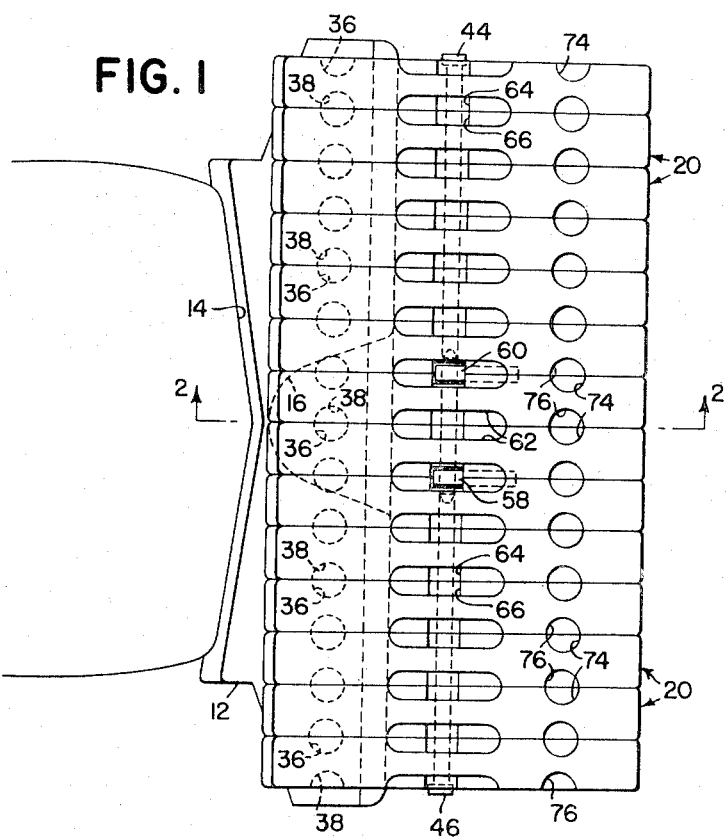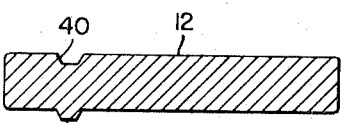

TRACTOR FRONT-END WEIGHT ASSEMBLY

BACKGROUND OF THE INVENTION

The present invention relates to a front-end weight assembly for an agricultural tractor, and more particularly relates to an assembly of the type wherein selected numbers of identical plate-shaped weights are mounted in side-to-side abutting relationship across a transverse base weight fixed to the forward end of the tractor.

Plate-shaped ballast weights are known (British Pat. specification No. 1,149,686), which are mounted on both sides of a forwardly extending clevis or hitch connection, from a vertical baseplate to which each weight is individually fastened by screws. These assemblies have the disadvantages that each weight must be provided with threaded bores, separate screws must be screwed into each weight, and the area occupied by the clevis is not available for the mounting of a weight.

There is also known another arrangement of plate-shaped ballast weights of the above-mentioned type wherein the weights are fastened individually on a mounting base by means of screws. While in this arrangement, weights may be secured along the entire width of the base, no provision is made for a forwardly extending hitch. This arrangement also has the above-mentioned disadvantages of requiring threaded bores in, and screws for, each of the weights.

SUMMARY OF THE INVENTION

Accordingly to the present invention, there is provided a novel front-end weight assembly of the type including a plurality of identical, plate-shaped weights, a selected number of which may be removably mounted on a transverse base weight fixed to the forward end of a tractor.

An object of the invention is to provide an assembly including plate-shaped weights which are relatively inexpensive to manufacture and which require a minimal amount of time and effort to assemble.

Another object is to provide an assembly wherein the plate-shaped weights may be mounted across the entire length of the base weight and wherein the base weight and the plate-shaped weights are respectively configured to provide hitch connections which are respectively usable before and after the plate-shaped weights are mounted on the base weight.

A more specific object is to provide an assembly wherein the only hardware necessary for mounting the plate-shaped weights on the base weight is a centering pin and two clamping screws with nuts.

Another specific object is to provide an assembly wherein only two lengths of clamping screws are required to mount selected numbers of the plate-shaped weights on the base weight.

These and other objects will become apparent from the ensuing description and the appended drawings.

BRIEF DESCRIPTION OF THE DRAWING

FIG. 1 is a top plan view showing a plurality of the plate-shaped weights mounted on a base weight connected to a tractor.

FIG. 2 is a sectional view taken along the line 2—2 in FIG. 1.

FIG. 3 is a sectional view taken along line 3—3 in FIG. 1.

FIG. 4 is a view of a modified form of nut for the clamping screws.

DESCRIPTION OF THE PREFERRED EMBODIMENT

Referring now to FIGS. 1 and 2, there is shown a front-end weight assembly designated in its entirety by the numeral 10. The weight assembly 10 includes a barlike base or supporting weight 12 fixed crosswise to the forward end of a tractor 14. Cast integrally in the forward center portion of the base weight 12 is clevis 16 having a vertical bore 18 adapted to receive a hitch pin (not shown) to be used as a hitch connection when no additional ballast is mounted on the base weight 12.

Shown removably mounted on the base weight 12 in side-to-side engagement with one another are a plurality of identical plate-shaped weights 20. The rear edge of each of the mounted weights 20 is provided with a rearwardly opening, U-shaped recess 22 including a downwardly directed, hook-shaped upper surface 24 that is engaged over an upturned lip 26 which is integral with and extends over the entire length of the upper forward portion of the weight 12. Similarly, a bearing surface 28 extends over the entire length of the lower, forward portion of the weight 12 and it supportingly engages respective forward surfaces 30 of the recesses 22.

The mounted weights 20, as viewed facing the tractor 14 in FIG. 1, are located half to the right and half to the left side of a centering pin 32 located in the bore 18 and retained therein by a split pin 34 inserted in a bore in the midportion of the centering pin. In the right and left sides of each of the weights 20 in the region of the recess 22 are respective, vertically extending, semicylindrical grooves 36 and 38 which have closed ends. The right groove 36 of each weight 20 cooperates with the opposed left groove 38 of an adjacent or neighboring weight 20 to form a receptacle which, in the case of the pair of weights disposed respectively adjacent the right and left sides of centering pin 32, embracingly engages the opposite sides of the centering pin 32.

To add to the stability of the group of mounted weights 20, there is provided respectively in the regions below the right and left grooves 36 and 38 a vertically disposed recess 40 and a projection 42. The projection 42 of each weight 20 is shaped complimentary to the recess 40 and is received in the recess 40 of the adjacent or neighboring weight.

The weights 20 are held in engagement with one another and are held fixed relative to the pin 32 by means of a pair of long clamping screws 44 and 46. The screws 44 and 46 are respectively inserted from the right and left sides of the mounted weights 20, respectively into transverse bores 48 and 50, positioned similarly, one above the other, in a central region of each of the weights 20. In the forward edge of each of the weights 20 is a forwardly opening, U-shaped recess 52, and in the right and left sides of each of the weights 20 and extending horizontally rearwardly from the recess 52 respectively to the bores 48 and 50 are upper and lower pairs of horizontal flat cutouts 54, 54 and 56, 56. The opposed upper cutouts 54 of adjacent ones of the weights 20 permit the selective insertion of a long, flat nut 58, which in FIG. 1 is shown inserted between the pair of weights to the immediate left of the centering pin 32 and on the screw 44. Similarly, the opposed lower cutouts 56 of adjacent ones of the weights 20 permit the selective insertion of a long, flat nut 60 which, in FIGS. 1 and 2, is shown inserted between the pair of weights to the immediate right of the centering pin 32 and on the screw 46. Thus, as illustrated, the screws 44 and 46 lie vertically, one above the other, with the end portions overlapping. It is to be noted that an overlap through at least two of the weights 20 is desired and that with fewer than the illustrated number of weights the overlap will be greater. Also, when fewer than eight weights are mounted, a shorter pair of clamping screws (not shown) are necessary so as not to leave undesirable lengths of the threaded screw ends exposed at opposite sides of the mounted weights 20.

An alternate place of selective insertion for a modified form of nut for the screws 44 and 46 is provided. Specifically, there is a handhold recess 62 in the upper edge of each of the weights 20 from which a pair of vertical, flat cutouts 64 and 66 in the opposite sides of the weights 20 extend to the bores 48 and 50. A pair of long, flat nuts 68 may be selectively inserted into the cutouts 64 and 66. To permit the end portions of the screws 44 and 46 to be overlapped, as shown in FIG. 1, the nuts 68 are provided with a through bore 70 as well as a threaded bore 72, whereby the screw 44 may be inserted in the through bore of the nut 68 provided for the screw 46, and vice versa. The interchangeability of the nuts 68 is made possible by the provision of two through bores 70 and two threaded bores 72, which bores are arranged such that one of each pair of the threaded and through bores will respectively be aligned with the transverse bores 48 and 50 in the weights 20, depending upon which end of the nut 68 is first inserted into the cutouts 64 and 66.

In order that there be a usable, forwardly extending hitch connection when the mounted weights 20 obstruct the use of the clevis 16 of the main weight 12, each weight 20 is provided at its opposite sides with a second pair of right and left, semicylindrical grooves 74 and 76, which extend vertically from the top edge of each of the weights 20 in the region of the forward recess 52. A hitch pin (not shown) is adapted to be selectively inserted in any one of the vertical receptacles formed between adjacent weights across the length of the mounted weights, by the cooperating grooves 74 and 76.

The operation of the front-end weights assembly 10 is as follows:

When it is desired to add ballast to the front end of the tractor 14, the main weight 12 is secured to the front end of the tractor. If the weight 12 adequately serves the ballast needs of the tractor, it is used alone and use may be made of the clevis 16 by merely providing a hitch pin. If additional ballast is required, two or more pairs of the weights 20 are mounted on the main weight 12. This is down by the first inserting the centering pin 32 in the bore 18 and securing the pin against falling out by means of the split pin 34. A pair of the weights 20 are then engaged with the base weight at opposite sides of the centering pin 32 by disposing the hook-shaped surface 24 of the recesses 22 over the upturned lip 26. The pair of weights 20 are then slid together so that the centering pin 32 is disposed in and engaged by the opposed semicylindrical grooves 36 and 38. At the same time, the projection 42 of the right weight will be inserted into the recess 40 of the left weight. Thereafter, additional pairs of weights may be added by disposing them to the left and right, respectively, of the first two weights, and by sliding them toward the first two weights until the opposed projections 42 and recesses 40 are interlocked.

When the desired number of weights 20 are suspended on the main weight 12, they are held together as a unit by first inserting the nuts 58 and 60 between a pair of the weights 20, respectively, in selected ones of the upper and lower horizontal cutouts 54 and 56 and then by inserting the screws 44 and 46 respectively into the aligned upper and lower bores 48 and 50 of the weights and then screwing them into the nuts 58 and 60. It is to be noted that in some instances, depending on the screw lengths and the number of mounted weights 20, the nuts 58 and 60 may be located in the cutouts 54 and 56 on the respective opposed outer sides of the right- and leftmost weights 20 of the group. Also, it should be noted that it is desirable to choose the lengths of the screws such that they will overlap at least the two weights disposed on the opposite sides of the centering pin 32, and when so chosen only two lengths of screws are necessary to mount most even-numbered groupings of the weights 20 on the base weight 12.

If desired, the nuts 68 may be used in lieu of the nuts 58 and 60 to secure the screws 44 and 46, and when used they are inserted between the weights 20 in selected ones of the vertical openings formed by the opposed cutouts 64 and and the opposed cutouts 66. To align one of the threaded bores 72 of the nut 68 with the screw 44, the nut 68 is inserted so that the threaded bore 72 is lowermost. On the other hand, if it is desired to align the threaded bore 72 with the screw 46, the nut 68 is inserted so that the threaded bore 72 lies above the through bore 70. Because of the overlapped end portions of the screws 44 and 46, the end portions of the screws 44 and 46 will respectively extend through the through bore of the nut 68 provided for the other screw.

When the weights 20 are mounted on the base weight 12, the clevis 16 is blocked from use. However, a hitch connection may then be provided forwardly of the tractor 14 merely by inserting a hitch pin in selected ones of the receptacles formed by the opposed, semicylindrical grooves 68 and 70 of adjacent pairs of the weights 20.

Thus, the mounting of the plate-shaped weights 20 merely requires, in addition to the base weight 12, a centering pin and a pair of clamping screws with nuts. The various recesses, grooves, cutouts, and projections are all easily formed in the casting of the weights 20, and the only additional work necessary on the weights 20, after their casting, is the drilling of the transverse through bores 48 and 50.

I claim:

1. In a front-end weight assembly of the type including an elongate base weight, adapted for connection to the forward end of a tractor, at least two identical plate-shaped weights, said base weight and said plate-shaped weights having cooperative surfaces disposed such that said plate-shaped weights may be transversely, slidably engaged upon and suspended from said base weight, the improvement comprising: connection means for securing said plate-shaped weights on said base weight including a centering pin connected to and extending crosswise to said base weight in the path of transverse sliding of the engaged plate-shaped weights; said two plate-shaped weights being disposed on opposite, transverse sides of said centering pins; and means solely associated with said plate-shaped weights for holding said plate-shaped weights together and in fixed relationship to said centering pin.

2. The invention defined in claim 1 wherein said last-mentioned means includes a pair of transverse through bores in each of said plate-shaped weights; and a pair of clamping screws being inserted into said through bores and nut means for engaging the ends of said clamping screws.

3. The invention defined in claim 2 wherein more than two plate-shaped weights are mounted on said base weight, said clamping screws being inserted from the opposite transverse sides of the mounted weights, the screws being of such length that the end portions of the screws overlap and the end portion of at least one of the screws extends through the two plate-shaped weights located adjacent the opposite sides of said centering pin.

4. The invention defined in claim 1 and further including a pair of semicylindrical grooves respectively in the opposite transverse sides of said plate-shaped weights, said grooves being disposed such that opposed ones of the grooves in the weights adjacent the opposite sides of the centering pin receive and embracingly engage the centering pin whereby the plate-shaped weights adjacent the opposite sides of the centering pin may be brought into side-to-side engagement with each other.

5. The invention defined in claim 1 wherein the base weight includes a forwardly opening clevis located centrally in its transverse forward side and having a vertical bore formed therethrough whereby a first hitch connection is provided by said base weight when no plate-shaped weights are mounted on the base weight, said centering pin being received in said vertical bore and said two plate-shaped weights being configured to cooperate with each other to provide a second hitch connection adjacent their forward edges.

6. The invention defined in claim 4 wherein the base weight includes a forwardly opening clevis located centrally in its transverse forward side and having a vertical bore formed therethrough whereby a first hitch connection is provided by said base weight when no plate-shaped weights are mounted on the base weight, said centering pin being received in said vertical bore and said two plate-shaped weights being configured to cooperate with each other to provide a second hitch connection adjacent their forward edges.

7. The invention defined in claim 6 wherein the said second hitch connection includes a forwardly opening, U-shaped recess in the forward edges of said plate-shaped weights and a pair of semicylindrical grooves being respectively in the opposite, transverse sides of each of said weights and extending vertically in the region of the recess whereby opposed ones of the grooves in the weights cooperate to form a vertical opening adapted to receive a hitch pin.

8. The invention defined in claim 5 wherein more than two plate-shaped weights are mounted on the base weight thereby hitch connections are provided between each of the opposed sides of adjacent weights mounted across the length of the base weight.

9. The invention defined in claim 7 wherein more than two plate-shaped weights are mounted on the baseplate whereby hitch connections are provided between each of the opposed sides of adjacent weights mounted across the length of the base weight.

10. The invention defined in claim 2 wherein said nut means includes a pair of relatively long and flat nuts and wherein cutout means are provided in at least the respective transverse sides of the plate-shaped weights which are remote from the centering pin, said cutout means intersecting said transverse bores and being dimensioned to receive and prevent the rotation of said nut means.

11. The invention defined in claim 10 wherein said cutout means includes at least one pair of similarly disposed cutouts in the transverse opposite sides of each of the plate-shaped weights, said one pair of cutouts extending from one edge of said plate-shaped weights and said nut means including a pair of nuts adapted for selective insertion between adjacent plate-shaped weights in the openings defined by opposed ones of said cutouts.

12. The invention defined in claim 10 wherein said transverse through bores are disposed vertically, one above the other, and wherein said cutout means includes a pair of vertical cutouts in the opposite transverse sides of each of said plate-shaped weights extending from the upper edge of each weight to said through bores and an upper pair and a lower pair of horizontal cutouts in the opposite transverse sides of each of said plate-shaped weights extending from the forward edge of each weight respectively to said through bores and wherein said nut means includes optionally usable, first and second pairs of nuts which are respectively adapted to be selectively inserted respectively in one of the upper and lower horizontal, or in one of the vertical openings defined respectively by opposed ones of the upper and lower or vertical cutouts of adjacent weights.

13. The invention defined in claim 1 wherein said plate-shaped weights are configured such that adjacent ones cooperate with each other to provide a hitch connection adjacent their forward edges.

14. The invention defined in claim 13 wherein said hitch connection includes a forwardly opening, U-shaped recess in each of said plate-shaped weights and a pair of semicylindrical grooves, respectively in the opposite transverse sides of each of the weights, extending vertically in the region of said recess, whereby opposed ones of the grooves in the weights cooperate to form a vertical opening adapted to receive a hitch pin.

15. The invention defined in claim 1 wherein said plate-shaped weights on the opposite sides of said centering pin are oppositely grooved to embracingly receive said centering pin whereby said plate-shaped weights may be mounted in side-to-side abutting relation with each other, and said plate-shaped weights each including a projection and a complimentary-shaped recess on opposite, transverse sides whereby the projection of one plate-shaped weight may be received in the opposed recess of the adjacent plate-shaped weight to add additional stability to the mounted weights.

16. The invention defined in claim 10 wherein said transverse bores are disposed vertically, one above the other, and wherein said cutout means includes a pair of horizontal cutouts disposed vertically, one above the other, in each of the opposite transverse sides of and which extend from the forward edge of each of the plate-shaped weights and wherein said nut means includes first and second nuts respectively received in one of the openings formed by opposed upper and lower horizontal cutouts of adjacent plate-shaped weights.

* * * * *